(12) United States Patent
Griesmer et al.

(10) Patent No.: US 9,229,115 B2
(45) Date of Patent: Jan. 5, 2016

(54) TEMPERATURE STABILITY FOR A DIGITAL POSITRON EMISSION TOMOGRAPHY (PET) DETECTOR

(71) Applicant: KONINKLIJKE PHILIPS N.V., Eindhoven (NL)

(72) Inventors: Jerome John Griesmer, Mentor, OH (US); Thomas Leroy Laurence, North Royalton, OH (US); Sharon Xiaorong Wang, Highland Heights, OH (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/599,577

(22) Filed: Jan. 19, 2015

(65) Prior Publication Data

US 2015/0177386 A1 Jun. 25, 2015

Related U.S. Application Data (63) Continuation-in-part of application No. PCT/IB2014/066790, filed on Dec. 11, 2014.

(60) Provisional application No. 61/918,745, filed on Dec. 20, 2013.

(51) Int. Cl.
  *G01T 1/20* (2006.01)
  *G01T 1/161* (2006.01)

(52) U.S. Cl.
  CPC ............. *G01T 1/1612* (2013.01); *G01T 1/2018* (2013.01)

(58) Field of Classification Search
  CPC ............................ G01T 1/1612; G01T 1/2018
  See application file for complete search history.

(56) References Cited

U.S. PATENT DOCUMENTS

| | | | |
|---|---|---|---|
| 6,448,559 B1 | 9/2002 | Saoudi et al. | |
| 8,188,436 B2 | 5/2012 | Ladebeck et al. | |
| 2004/0188623 A1 | 9/2004 | Breeding et al. | |
| 2006/0076500 A1 | 4/2006 | Watanabe | |
| 2007/0029496 A1 | 2/2007 | Bouhnik et al. | |
| 2007/0158575 A1 | 7/2007 | Heismann et al. | |
| 2011/0240864 A1 | 10/2011 | Degenhardt et al. | |
| 2011/0248175 A1* | 10/2011 | Frach et al. ............. | 250/363.03 |
| 2011/0270077 A1 | 11/2011 | Kang et al. | |

FOREIGN PATENT DOCUMENTS

| | | |
|---|---|---|
| JP | 2009293974 A | 12/2009 |
| WO | 2010067220 A2 | 6/2010 |
| WO | 2012066469 A1 | 5/2012 |

* cited by examiner

*Primary Examiner* — Mark R Gaworecki (57) ABSTRACT

A detector maintains thermal stability between two different operating modes. The detector includes at least one controller which sets the detection sensitivity of the detector to a level disabling the detection of gamma photons. The controller further controls a heat generator to maintain the temperature of the detector at a predetermined temperature. The predetermined temperature is the steady state temperature of the detector when the detection sensitivity of the detector is set to a level enabling the detection of gamma photons. A method for maintaining thermal stability of a detector between two different operating modes is also provided. Approaches are also disclosed for normalize acquired imaging data during image reconstruction using dark current-dependent normalization factors.

24 Claims, 8 Drawing Sheets

TEMPERATURE STABILITY FOR A DIGITAL POSITRON EMISSION TOMOGRAPHY (PET) DETECTOR

CROSS REFERENCE TO RELATED APPLICATIONS

This application is a continuation-in-part of PCT application Serial No. PCT/IB2014/066790, filed Dec. 11, 2014, which claims the benefit of U.S. provisional application Ser. No. 61/918,745 filed Dec. 20, 2013, which is incorporated herein by reference.

The following relates generally to nuclear imaging. It finds particular application in conjunction with the temperature stability of a digital positron emission tomography (PET) detector, and will be described with particular reference thereto. However, it is to be understood that it also finds application in other usage scenarios and is not necessarily limited to the aforementioned application.

When a digital PET scanner is positioned proximate to a computed tomography (CT) scanner, such as in a hybrid PET/CT system, the PET scanner can receive Compton scattered gamma photons from the CT scanner. As the gamma photons are received by the PET scanner, the scintillators of the PET detector scintillate and the cells of the digital PET detector discharge. For each scintillation event, multiple cells are discharged and subsequently recharged nearly simultaneously. This recharging causes an increase, typically a substantial increase, in current draw, which can overload the power supply.

The present application provides a new and improved system and method which overcome these problems and others.

In accordance with one aspect, a gamma detector with thermal stability is provided. The gamma detector includes at least one controller which sets the detection sensitivity of the detector to a level disabling the detection of gamma photons. The controller further controls a heat generator to maintain the temperature of the detector at a predetermined temperature, the predetermined temperature being the steady state temperature of the detector when the detection sensitivity of the detector is set to a level enabling the detection of gamma photons.

In accordance with another aspect, a method for maintaining thermal stability of a gamma detector is provided. A determination is made as to whether the detection sensitivity of the detector is set to a level disabling the detection of gamma photons. In response to determining that the detection sensitivity of the detector is set to a level disabling the detection of gamma photons, heat is generated to maintain the current temperature of the detector at a predetermined temperature. The predetermined temperature is the steady state temperature of the detector when the detection sensitivity of the detector is set to a level enabling the detection of gamma photons.

In accordance with another aspect, a nuclear imaging system is provided. The system includes a detector including a quiet mode and a data collection mode. The detector includes at least one controller which determines whether the detector is in quiet mode or data collection mode. In response to determining that the detector is in quiet mode, the controller generates heat to maintain the current temperature of the detector at the steady state temperature of the detector in the data collection mode.

In accordance with another aspect, an imaging system comprises a gamma detector including scintillators and detector pixels configured to detect light pulses generated in the scintillators by gamma photons. The imaging system further includes electronic components configured to: acquire imaging data using the gamma detector and concurrently measure dark currents of the detector pixels of the gamma detector; determine dark current-dependent normalization factors for detector pixels of the gamma detector based on the measured dark currents of the detector pixels; normalize the acquired imaging data using the dark current-dependent normalization factors to generate normalized imaging data; and generate a reconstructed image from the normalized imaging data. In some embodiments the detector pixels comprise silicon photomultipliers (SiPMs) configured to perform photon counting using a trigger-and-validate process and the electronic components are configured to measure dark currents as non-validated trigger rates of the detector pixels.

In accordance with another aspect, in an imaging system of the immediately preceding paragraph the electronic components may be further configured to generate dark current-dependent normalization factors as a function of dark current for detector pixels of the gamma detector by operations including: (i) acquiring count rates for detector pixels of the gamma camera for a calibration radiation source uniformly irradiating the detector pixels; (ii) concurrently with operation (i), measuring dark currents for the detector pixels; (iii) generating detector pixel normalization factors for the detector pixels from the count rates acquired in operation (i); (iv) repeating operations (i)-(iii) for at least two different temperatures of the gamma detector to generate detector pixel normalization factors for each detector pixel at different measured dark currents; and (v) generating dark current-dependent pixel normalization factors as a function of dark current for the detector pixels from the detector pixel normalization factors at different measured dark currents.

One advantage resides in improved temperature stability of a digital positron emission tomography (PET) detector.

Another advantage resides in improved PET imaging quality and quantization.

Still further advantages of the present invention will be appreciated to those of ordinary skill in the art upon reading and understand the following detailed description.

The invention may take form in various components and arrangements of components, and in various steps and arrangements of steps. The drawings are only for purposes of illustrating the preferred embodiments and are not to be construed as limiting the invention.

To avoid the effects of gamma photons from a computed (CT) scanner, the bias voltage of a positron emission tomography (PET) detector can be lowered to a level suitable to prevent the cells of the PET detector from triggering during the CT scan. When the CT scan is complete, the bias voltage can be returned to the proper calibration level for the PET scanner. One challenge with mitigating the effects of the CT scanner by varying the bias voltage is that background events also go undetected when in a low bias state, thereby resulting in a temperature drop. When the bias voltage is returned to the normal bias voltage, the temperature then rises.

While the temperature variation due to changes in in the bias voltage is manageable, it's preferable to avoid it. Among other things, repeated changes in temperature can reduce the mean time before failure (MTBF) of the PET detector. Further, variations in temperature reduce the quality of PET images, since the behavior (e.g., conversion efficiency, energy centroid, pixel sensitivity, etc.) of the scintillators varies based on temperature.

To avoid the temperature variation, a PET detector can enable a heat generator when in a "quiet" mode to maintain the steady state temperature typical of the gamma detector when in a "data collection" mode. The quiet mode typically reduces the bias voltage of silicon photomultipliers (SiPMs) of the detector so visible light pulses go undetected. The heat generator can be a controller of the detector, a resistive heater, or any other device which generates heat. The controller can generate the heat by carrying out busy work. The heat generator can be controlled based on parameters predetermined to achieve the requisite amount of heat or based on feedback from a temperature sensor.

Figure 1:
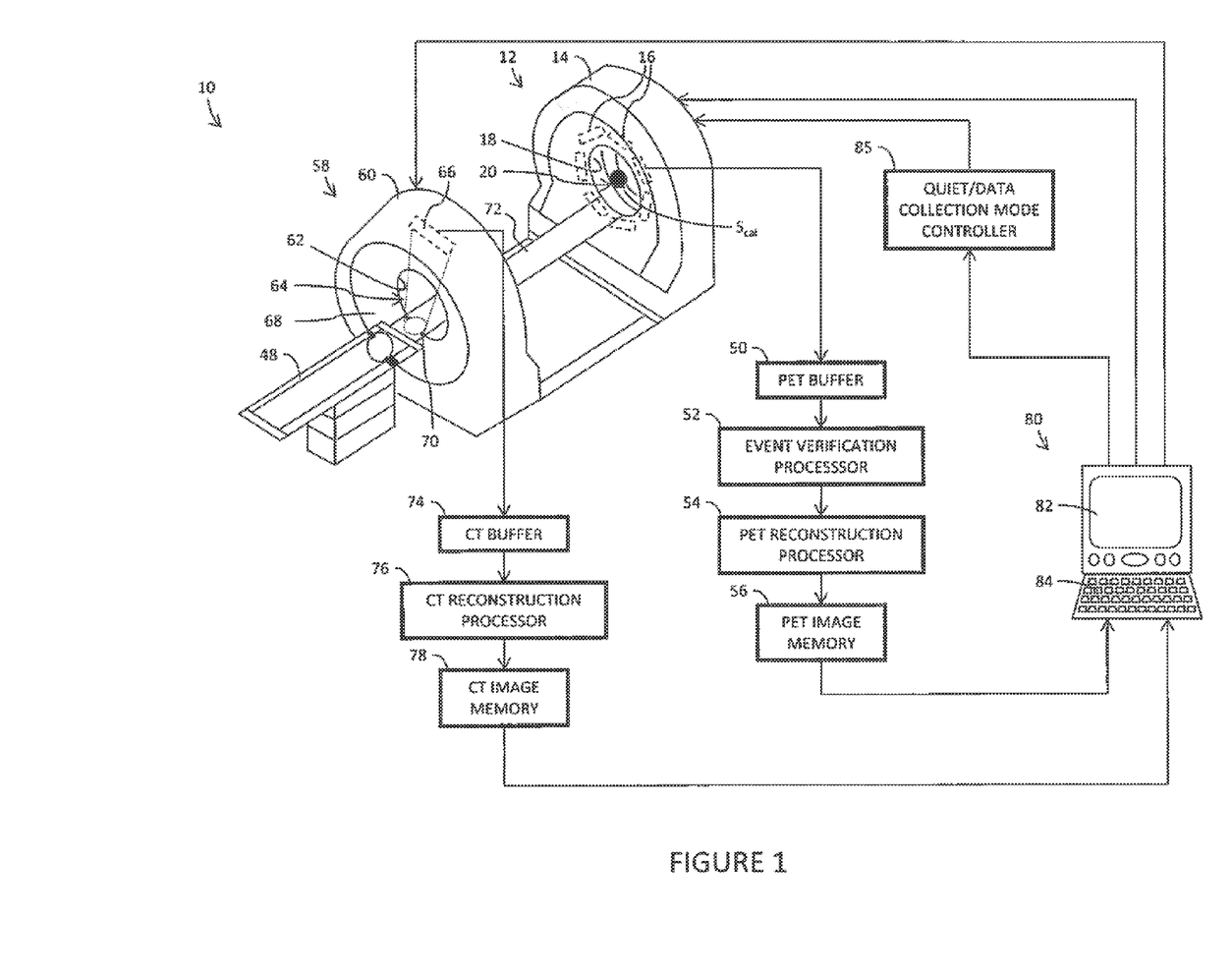
FIG. 1 illustrates a diagnostic imaging system employing a first, nuclear imaging modality and a second imaging modality according to aspects of the present application.

With reference to FIG. 1, a diagnostic imaging system 10 employing first and second imaging modalities to image a subject is provided. The first imaging modality is a nuclear imaging modality using radiation, such as gamma photons, received from a target volume of the subject for imaging. Examples of such nuclear imaging modalities include PET and single-photon emission computed tomography (SPECT). The second imaging modality is computed tomography (CT) or any other imaging modality generating radiation of the type used by the first imaging modality for imaging. As illustrated, the system is a hybrid PET/CT diagnostic imaging system.

A first, nuclear scanner 12, illustrated as a PET scanner, of the system 10 generates raw scan data for the first, nuclear imaging modality. The scanner 12 includes a stationary gantry 14 housing a plurality of gamma detectors 16 (e.g., 90 detectors) arranged around a bore 18 of the scanner 12. The bore 18 defines an examination volume 20 for receiving a target volume of a subject to be imaged, such as a brain, torso, or the like. The detectors 16 are typically arranged in one or more stationery rings which extend the length of the examination volume 20. However, rotatable heads are also contemplated. The detectors 16 detect gamma photons from the examination volume 20 and generate the raw scan data.

Figure 2:
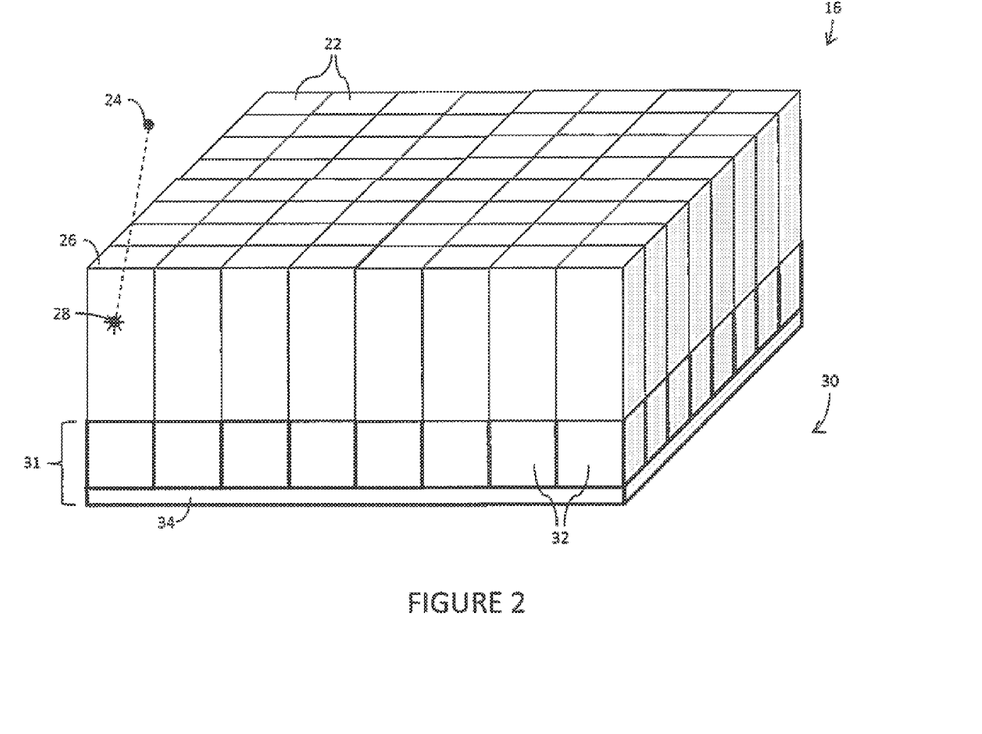
FIG. 2 illustrates one tile of a gamma detector of the diagnostic imaging system of FIG. 1.

With reference to FIG. 2, each of the detectors 16 includes one or more scintillators 22 arranged in a grid. The scintillators 22 scintillate and generate visible light pulses in response to energy depositions by gamma photons. As illustrated, a gamma photon 24 deposits energy in a scintillator 26, thereby resulting in a visible light pulse 28. The magnitude of a visible light pulse is proportional to the magnitude of the corresponding energy deposition. Examples of scintillators 22 include sodium iodide doped with thallium (NaI(Tl)), cerium-doped lutetium yttrium orthosilicate (LYSO) and cerium doped lutetium oxyorthosilicate (LSO).

In addition to the scintillators 22, the detectors 16 each includes a sensor 30 detecting the visible light pulses in the scintillators 22. Each sensor 30 includes a plurality of tiles 31 arranged in a grid of like size as the grid of scintillators 22. Typically, a sensor 30 includes four tiles 31, but only one tile 31 is illustrated. Typical power usage of a tile 31 is about 1.0 watt (W) at idle conditions (i.e., background event rate from the internal decay of the scintillators 22), about 1.1 W at typical oncology patient levels, and about 1.5 W at typical Rubidium (Rb) 82 cardiac patient levels. A tile 31 includes a plurality of SiPMs 32 (i.e., pixels) optically coupled to corresponding scintillators 22. There is often a one-to-one correspondence between the scintillators 22 and the SiPMs 32, as illustrated, but other correspondences are contemplated. Suitably, the SiPMs 32 are configured to operate in a Geiger mode to produce a series of unit pulses to operate in a digital mode. Alternatively, the SiPMs 32 can be configured to operate in an analog mode. Each of the SiPMs 32 includes a photodiode array (e.g., Geiger-mode avalanche photodiode arrays), each photodiode corresponding to a cell of the photodiode array.

Figure 3:
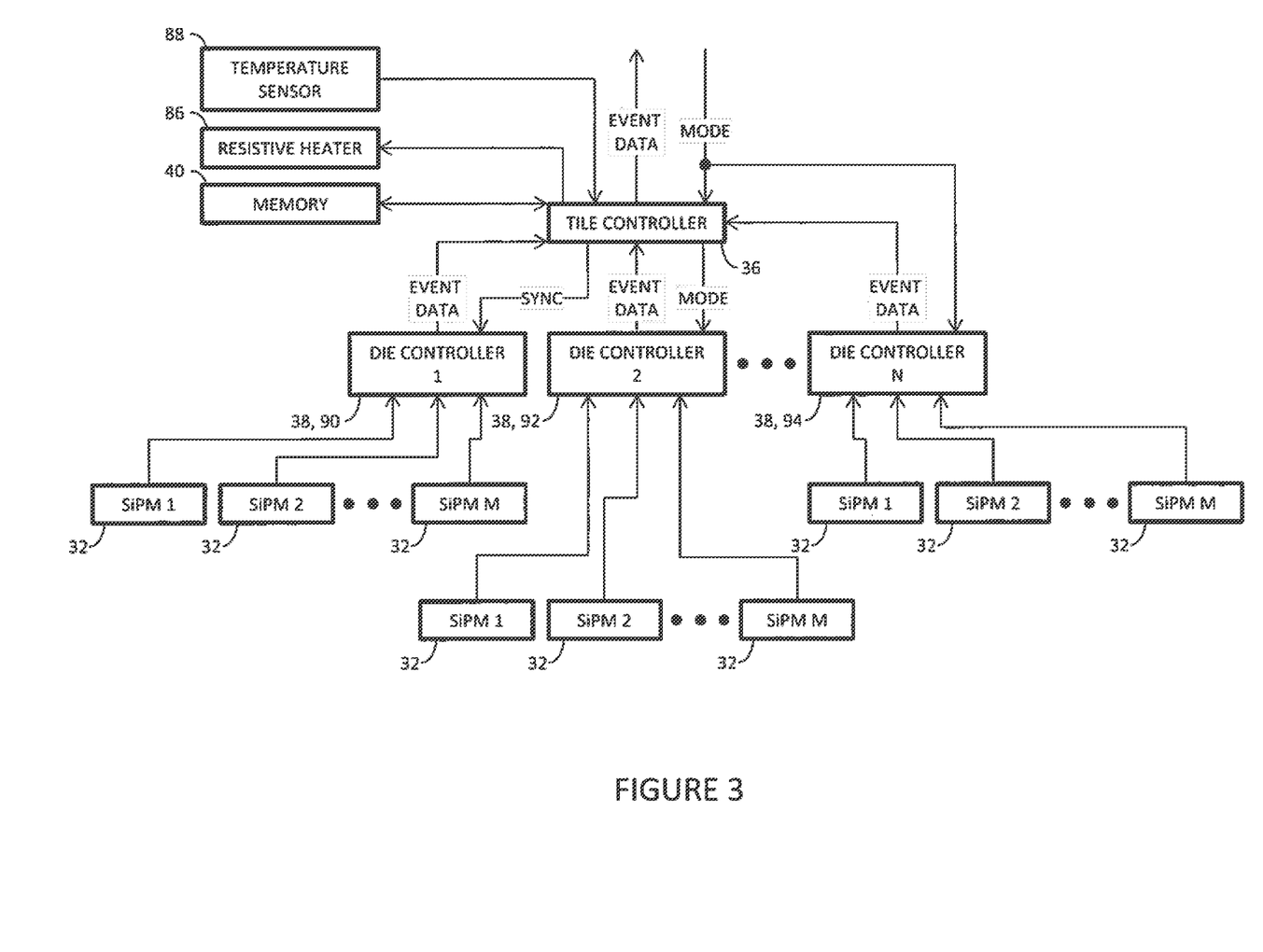
FIG. 3 illustrates a block diagram of the electrical components of the detector of FIG. 2.

A circuit board 34 of a tile 31 supports the corresponding SiPMs 32, as well as other electronic components of the tile 31. Referring to FIG. 3, these other electronic components include a tile controller 36 (e.g., a field-programmable gate array (FPGA)) and a die controller 38 (e.g., non-programmable complementary metal-oxide-semiconductor (CMOS) controllers) for each of a plurality of divisions of the SiPMs 32, illustrated as N>=1 die controllers 38. The divisions correspond to equally sized arrays of SiPMs (i.e., dies) forming the grid of SiPMs 32. For example, the tile 31 can include an 8×8 grid of SiPMs 32, as illustrated, divided into 4×4 arrays of SiPMs 32. The die controllers 38 are typically located on the same side of the circuit board 34 as the SiPMs 32 (e.g., proximate the inner diameter of a ring formed by the detectors 16), and the tile controller 36 is typically located on the opposite side of the circuit board 34 as the SiPMs 32 (e.g., proximate the outer diameter of a ring formed from by the detectors 16).

A die controller 38 generates event data (i.e., time and energy) regarding events detected by the corresponding SiPMs 32. As illustrated, each die controller 38 generated event data for M>=1 SiPMs 32. The tile controller 36 aggregates the data from the die controllers 38 and then sends the aggregated data downstream. Typically, the aggregated event data is sent downstream in frames of a fixed time, such as 327.68 microseconds (μsecs). In that regard, event data is buffered in a memory 40 of the tile 31 for the fixed time. When the fixed time expires, the buffered event data is sent downstream with an "end of frame" marker. If no event data is stored, just the "end of frame" marker is sent. The "end of frame" markers can be used to track time stamp alignment between tiles. The tile controller 36 can further perform basic processing, such as saturation and skew correction, on the event data before sending it downstream.

Figure 4A:
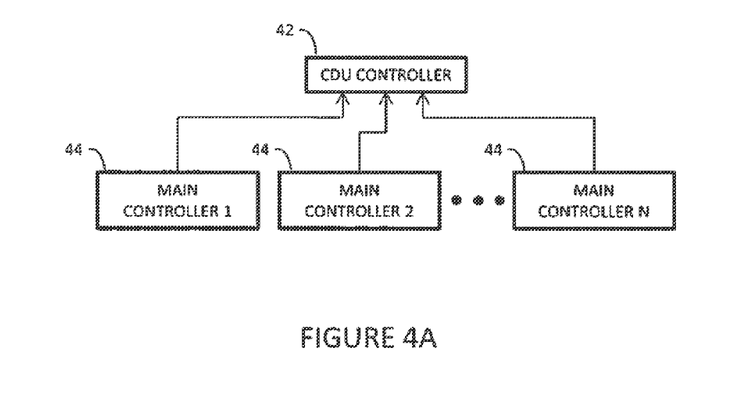
FIG. 4A illustrates the root of a hierarchical tree structure of controllers of a first scanner implementing the first imaging modality of FIG. 1.
Figure 4B:
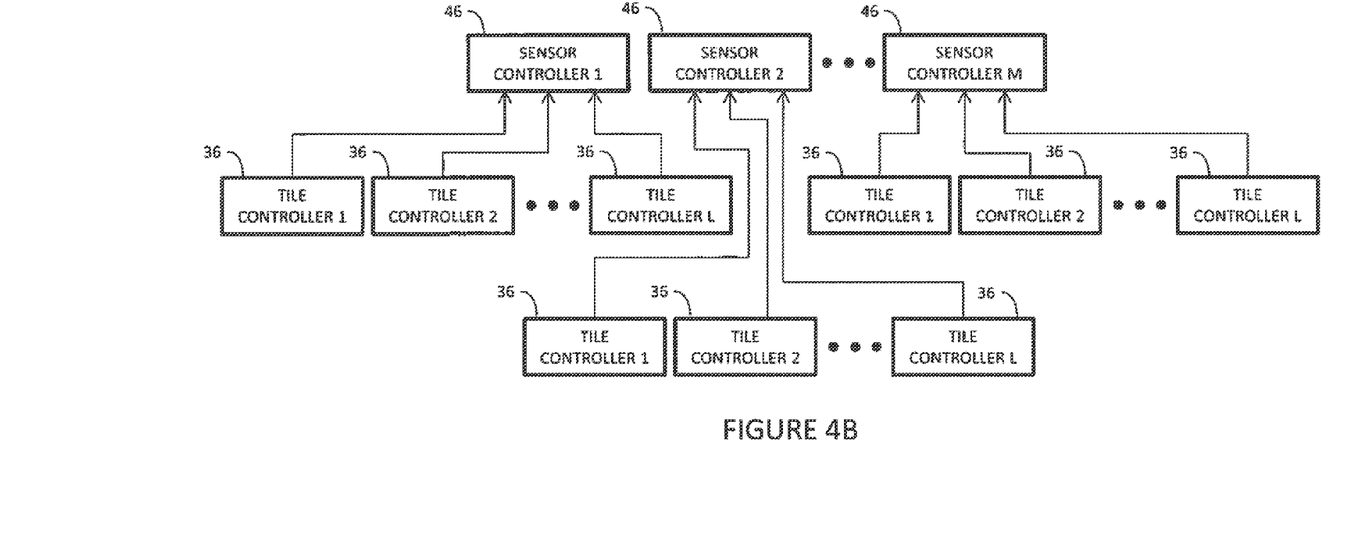
FIG. 4B illustrates a sub-tree of the hierarchical tree structure of FIG. 4A.

Referring to FIGS. 4A and 4B, the first, nuclear scanner 12 includes a plurality of aggregating controllers 36, 42, 44, 46 (e.g., FPGAs) arranged in a tree structure. These aggregating controllers 36, 42, 44, 46 include the tile controllers 36 (illustrated as L>=1 for each parent controller) and a central detector unit (CDU) controller 42. The CDU controller 42 represents the root of the tree structure, and the tile controllers 36 represent the leaves of the tree structure. Although not necessary, main controllers 44 (illustrated as N>=1) and/or sensor controllers 46 (illustrated as M>=1 for each main controller) can be arranged intermediate the tile controllers 36 and the CDU controller 42, as illustrated. The sensor controllers 46 each correspond to, for example, a different sensor 30. FIG. 4A illustrates the root of a tree structure, and FIG. 4B illustrates a sub-tree structure leading to each of the main controllers 44.

Within the tree structure, each of the aggregating controllers 36, 42, 44, 46 aggregates event data. The tile controllers 36 aggregate event data from the die controllers 38, and the other aggregating controllers 42, 44, 46 aggregate event data from child aggregating controllers. Further, each of the controllers 36, 42, 44, 46, except the CDU controller 42, passes the aggregated data along to a parent aggregating controller. For example, the CDU controller 42 can receive aggregated event data from a plurality of main controllers 44, such as 18 main controllers 44, which each receive aggregated event data from a plurality of sensor controllers 46, such as 28 sensor controller 46, which each receive aggregated event data from a plurality of tile controllers 36, such as four tile controllers 36, which each receive event data from a plurality of die controllers 38, such as 16 die controllers 38.

Referring back to FIG. 1, during a scan of a subject using the first imaging modality, a target volume of the subject is injected with a radiopharmaceutical or radionuclide. The radiopharmaceutical or radionuclide emits gamma photons, or causes gamma photons to be emitted, from the target volume. The target volume is then positioned in the examination volume 20 using a subject support 48 corresponding to the first scanner 12. Once the target volume is positioned within the examination volume 20, the first scanner 12 is controlled to perform a scan of the target volume and event data is acquired, typically from the CDU controller 42. The acquired event data describes the time, location and energy of each scintillation event detected by the detectors 16 and is suitably stored in a first data buffer 50, illustrated as a PET data buffer.

Subsequent to acquisition, or concurrently therewith, an event verification processor 52 filters the buffered event data. The filtering includes comparing energy (counts in the digital mode) of each scintillation event to an energy window, which defines the acceptable energy range for scintillation events. Those scintillation events falling outside the energy window are filtered out. Typically, the energy window is centered on the known energy of the gamma photons to be received from the examination volume 20 (e.g., 511 kiloelectron volt (keV)) and determined using the full width half max (FWHM) of an energy spectrum generated from a calibration phantom. For PET imaging, the event verification processor 52 can further generates lines of response (LORs) from the filtered event data.

A first reconstruction processor 54, illustrated as a PET reconstruction processor, reconstructs the filtered event data or the LORs, depending upon the imaging modality, into a nuclear image of the target volume. Any number of well-known algorithms for reconstructing the LORs into PET images is contemplated. Similarly, any number of well-known algorithms for reconstructing the filtered event data into SPECT images is contemplated. The nuclear images are suitably stored in a first image memory 56, illustrated as a PET image memory.

A second scanner 58, illustrated as a CT scanner, of the system 10 generates raw scan data for the second imaging modality. The second scanner 58 includes a stationary gantry 60, a bore 62 of which defines an examination volume 64 for receiving a target volume of a subject to be imaged, such as a brain, torso, or the like. As illustrated, an array of x-ray detectors 66 is housed within a rotating gantry 68 configured to receive transmission radiation from an x-ray source 70 (e.g., an x-ray tube) disposed opposite the detectors 66 on the rotating gantry 68. Alternatively, a ring of detectors is housed within the stationary gantry 60 around the rotating gantry 68 and configured to receive transmission radiation from the x-ray source 70 (e.g., an x-ray tube) disposed on the rotating gantry 68. The detectors 66 generate data indicative of the integrated x-ray absorption along a corresponding beam between the x-ray source and the detectors.

Typically, the first and second scanners 12, 58 are separate scanners spaced from one another. However, it is also contemplated that the first and second scanners 12, 58 can be integrated into a common scanner. Where the first and second scanners 12, 58 are separate scanners, the scanners 12, 58 are positioned adjacent to one another so that the gamma detectors 16 of the first, nuclear scanner 12 can detect radiation generated by the second scanner 58 during a scan. As illustrated, the first and second scanners 12, 58 can share a common subject 48 support that translates along a patient support track 72 extending between the two examination volumes 20, 64. Alternatively, the first and second scanners 12, 58 can include individual subject supports.

During a scan of a subject using the second imaging modality, the target volume of the subject is positioned in the examination volume 64 using the subject support 48 corresponding to the second scanner 58. Thereafter, raw scan data is acquired of the target volume using the second scanner 58. The acquired scan data is stored in a second data buffer 74, illustrated as a CT data buffer, and processed by a second reconstruction processor 76, illustrated as a CT reconstruction processor, into an image representation of the target volume. The image representation is stored in a second image memory 78, illustrated as a CT image memory.

The system 10 further includes a central control system 80, such as a computer, providing a graphical user interface (GUI) to users of the system 10. The GUI makes use of a display device 82 and a user input device 84 to allow the users to interact with the control system 80. By way of the GUI, the control system 80 can be employed to control the scanners 12, 58 to image a subject. For example, the user can coordinate a CT image followed by a PET image of a target volume of the subject. Further, by way of the GUI, the control system 80 can be employed to view and, optionally, manipulate images from the image memories 56, 78. For example, an image stored in the image memory 56 of the first scanner 12 can be displayed on the display device 82. In some instances, one or more of the data buffers 50, 74, the reconstruction processors 54, 76, the image memories 56, 78, and the event verification processor 52 are integrated with the central control system. For example, the reconstruction processors 54, 76 and the event verification processor 52 can share a common processor of the central control system 80.

A challenge with the first scanner 12 being positioned proximate to the second scanner 58 is that the first scanner 12 can receive radiation, such as Compton scattered gamma photons, from the second scanner 58 during a scan with the second scanner 58. As this radiation is received, the cells of the tiles 31 are discharged and subsequently recharged. In some instances, this recharging can cause a substantial increase in current draw by the tiles 31, which can overload the power supply. Further, the die and tile controllers 36, 40 of the tiles 31 increase in activity. The increased current draw and controller activity increases the temperature of the tiles 31. This is problematic because the scintillators 22 are proximate to the tiles 31, whereby variations in the temperature of the tiles 31 vary the temperature of the scintillators 22. Variations in the temperature of the scintillators 22, in turn, affect the behavior (e.g., conversion efficiency, energy centroid, pixel sensitivity, etc.) of the scintillators 22, which effects image quality. Further, repeated changes in temperature can reduce the MTBF of the tiles 31.

To mitigate the effects of the second scanner 58 on the first scanner 12, the first scanner 12 includes two operating modes: a "data collection" mode and a "quiet" mode. When in the data collection mode, the detection sensitivity of the tiles 31 is set to a level enabling the detection of gamma photons (i.e., a normal level for imaging) and the first scanner 12 is ready for collecting event data using the tiles 31. When in the quiet mode, detection sensitivity of the tiles 31 is set to a level disabling the detection of gamma photons. Typically, the difference between the two modes is the bias voltage of the SiPMs 32 of the tiles 31. In the quiet mode, the bias voltage is dropped to the level where light sensitivity is zero (i.e., to the level suitable to prevent the cells of the tiles 31 from triggering in response to light pulses).

The mode of the first scanner 12 is managed by a data collection/quiet mode controller 85. When the second scanner 58 is being used, the data collection/quiet mode controller 85 places the first scanner 12 in the quiet mode. Otherwise, the data collection/quiet mode controller 85 places the first scanner 12 in the data collection mode. The data collection/quiet mode controller 85 can control the mode of the first scanner 12 based on signals from the central control system 80, as illustrated. Alternatively, the data collection/quiet mode controller 85 can be integrated with the central control system 80. For example, the data collection/quiet mode controller 85 can be implemented by the central control system 80 as a software module.

In a typical workflow for imaging a target volume of a subject using the first and second scanners 12, 58, the first scanner 12 is controlled to enter the quiet mode. Thereafter, a target volume of the subject is scanned using the second scanner 58. Once the scan using the second scanner 58 is performed, the first scanner 12 is controlled to enter the data collection mode and the target volume is scanned using the first scanner 12. Hence, the target volume is typically scanned using the second scanner 58 and then scanned using the first scanner 12 (i.e., the second scanner 58 is used first). Where the two scanners 12, 58 share a common subject support 48, the target volume is typically injected with a radiopharmaceutical or radionuclide before performing the scan using the second scanner 58.

A challenge with varying the bias voltage as described above is that background noise also goes undetected. This reduces current draw due to recharging. Further, the die and tile controllers 36, 40 of the tiles 31 decrease in activity. The decreased current draw and controller activity of the tiles 31 decreases the temperature of the tiles 31. As noted above, variations in temperature of the tiles 31 vary the temperature of the scintillators 22, which affects behavior of the scintillators 22. While this is manageable, it is preferable to avoid it.

Figure 5:
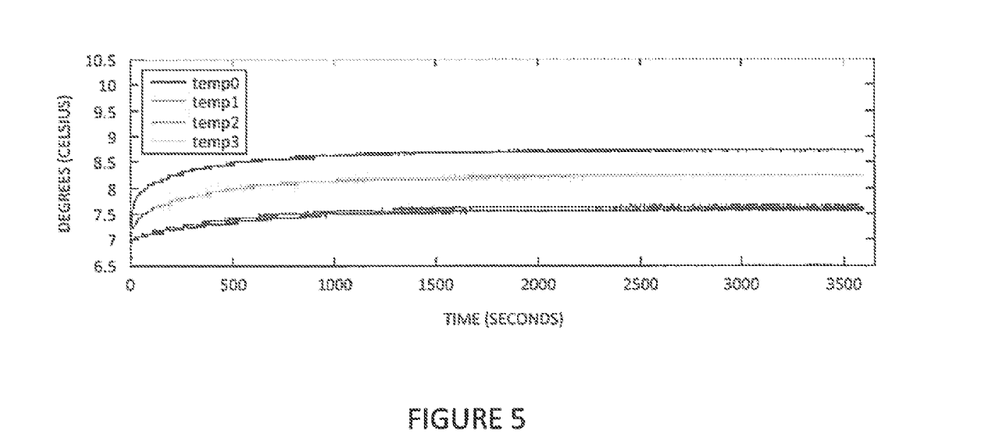
FIG. 5 illustrates a graph of the temperature versus time for four different temperature sensors of a detector after returning the bias voltage of the detector to the normal bias voltage.

With reference to FIG. 5, the above mentioned rise in temperature is illustrated by a graph of the temperature versus time for four different temperature sensors of a detector 16. The horizontal axis corresponds to time in seconds, and the vertical axis corresponds to temperature in degrees Celsius. Before the temperature measurements were collected, the detector 16 was in a low bias state for an hour. The detector 16 was then returned to the normal bias voltage and the temperature measurements were collected. As can be seen, once the detector 16 was returned to the normal bias voltage, temperature began to rise.

To address the variations in temperature of the scintillators 22 due to the different modes, the quiet mode can enable a heat generator included as part of each of the tiles 31. The heat generator directly or indirectly generates heat to maintain the steady state temperature of the tiles 31 in the data collection mode when in the quiet mode. The heat generator can employ any means of generating heat.

Referring back to FIG. 3, the heat generator of a tile 31 is suitably controlled by the tile controller 36. The tile controller 36 receives a mode signal indicative of the mode of the first scanner 12 (i.e., quiet mode or data collection mode). This signal is suitably received, directly or indirectly, from the quiet/data collection mode controller 85. The tile controller 36 monitors the signal and, when indicative of the quiet mode, controls the heat generator to maintain the steady state temperature of the tile 31 in the data collection mode.

The heat generator of a tile 31 can be, for example, the tile controller 36 of the tile 31. In such instances, the tile controller 36 carries out "busy work" to generate heat. The heat generator can also be, for example, a resistive heater 86 of the tile 31. The tile controller 36 can, for example, generate heat according to the foregoing approaches using feedback from a temperature sensor 88 (e.g., with $\frac{1}{16}$ degree Celsius resolution) of the tile 31. In such instances, the tile controller 36 can generate heat to maintain the current value of the temperature sensor 88 at the steady state value of the temperature sensor 84 in the data collection mode. As another example, the tile controller 36 can generate heat according to the foregoing approaches using control parameters predetermined to achieve the required amount of heating needed to maintain the steady state temperature of the tile 31 in the data collection mode. For example, it can be predetermined that 0.5 amperes of current needs to be applied to the resistive heater 86 to achieve the requisite heating.

The steady state temperature of each of the tiles 31 can be determined by performing a calibration scan with the first scanner 12. During the scan, the scanner 12 is placed in the data collection mode and temperature measurements are captured at a predetermined rate, such as 11.9209 samples per second, for a predetermined period of time, such as 15 minutes. The first scanner 12 is left empty and the second scanner 58 is not in use. The steady state temperature for each tile 31 is then determined as the average of the temperature measurements of the tile 31 over the predetermined period of time. In some instances, an initial "warm-up" period may precede the calibration scan.

Figure 6:
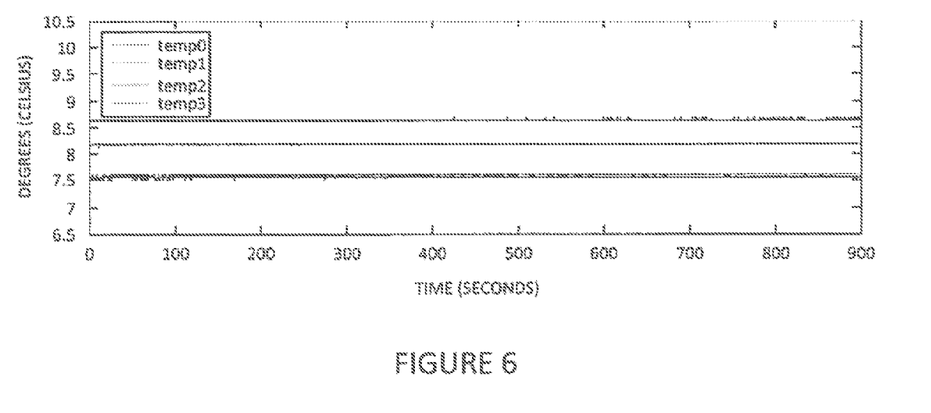
FIG. 6 illustrates the temperature profiles of four different tiles collected during a calibration scan.

With reference to FIG. 6, the temperature profiles for four different tiles 31 are graphed for a calibration scan. The vertical axes correspond to temperature in degrees Celsius, and the horizontal axes correspond to time in seconds. The temperature values were acquires using temperature sensors 88 of the tiles 31. During the scans, the bias voltage was fixed at the data collection level and a 200 megahertz (MHz) reference clock was left on to warm-up for over 2 hours initially. The tiles 31 measured temperature at an internal rate of 3051.8 samples per second. The measurements were downsampled to 11.9209 samples per second stored an output file representing the temperature profiles. As can be seen, the tiles 31 exhibit a high degree of temperature stability.

As an alternative to the foregoing approaches to generating heat, the heat generator can be the die controllers 38. In such instances, the tile controller 36 can control sync lines of the die controllers 38, as illustrated with a die controller 90, to create false events. Knowing that event data received from the die controllers 38 are "junk", the tile controller 36 simply discards the received event data. Alternatively, this data can be discarded higher up the hierarchy of FIGS. 4A and 4B. As above, the tile controller 36 can, for example, generate heat according to this approach using feedback from the temperature sensor 88. In that regard, the tile controller 36 can generate artificial events at the rates needed to maintain the current value of the temperature sensor 88 at the steady state value of the temperature sensor 84 in the data collection mode. As another example, the tile controller 36 can generate artificial events at rates predetermined to maintain the steady state temperature of the tiles 31 in the data collection mode. As another example, the tile controller 36 can generate artificial events at the steady state rates of the tiles 31 in the data collection mode. The steady state rates are the rates with which background events are detected.

The steady state event rates of each of the die controllers 38 are typically per frame period, such as 327.68 μsecs, and can be determined by performing a calibration scan with the first scanner 12. It's important that the calibration scan is performed with the scanner 12 in the same state it would be in for imaging a subject. During the scan, the scanner 12 is placed in data collection mode and event rates are measured at a predetermined rate, such as 11.9209 samples per second, for a predetermined period of time, such as 15 minutes. The first scanner 12 is left empty and the second scanner 58 is not in use. The steady state rate for each die controller 38 is then determined as the average of the steady state rates of the die controller 38 over the predetermined period of time. In some instances, an initial "warm-up" period may precede the calibration scan.

As an alternative to having the tile controller 36 control the die controllers 38 to generate heat, the die controllers 38 can generate heat independent of control from the tile controller 36. In such instances, the die controllers 38 receive an indication of the mode of the first scanner 12, typically from the tile controller 36, as illustrated for a die controller 92, or from a higher level controller, as illustrated for die controller 94. When in the quiet mode, each of the die controllers 38 can then generate artificial, junk events at the steady state rate of the die controller 38 in the data collection mode. Alternatively, the die controllers 38 can carry out "busy work" at rates predetermined to produce enough heat.

Figure 7:
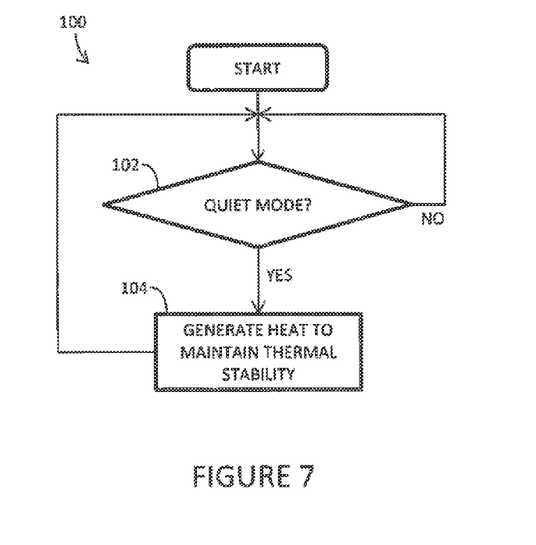
FIG. 7 illustrates a method for maintaining thermal stability of a gamma detector according to aspects of the present disclosure.

With reference to a FIG. 7, a method 100 for maintaining thermal stability of a gamma detector 16 of the first scanner 12 summarizes the above discussion. The method 100 includes determining 102 whether the detection sensitivity of the detector 16 is set to a level disabling the detection of gamma photons. As described above, the detection sensitivity of the detector 16 can be set by adjusting the bias voltage of the SiPMs 32. For example, the detection sensitivity of the detector 16 can be set to a low bias state before a CT scan, so as to prevent the power supply of the detector 16 from being overloaded.

Typically, the determination 102 as to whether the detection sensitivity of the detector 16 is set to a level disabling the detection of gamma photons is based off a mode signal indicative of the mode of the first scanner 12 (i.e., quiet mode or data collection mode). The quiet mode corresponds to a detection sensitivity level disabling the detection of gamma photons, and the data collection mode corresponds to a detection sensitivity level enabling the detection of gamma photons. The detection sensitivity level enabling the detection of gamma photons is typically determined during calibration of the detector 16. The mode signal is suitably received, directly or indirectly, from the central control system 80 coordinating imaging.

In response to determining that the detection sensitivity of the detector 16 is set to a level disabling the detection of gamma photons (i.e., the detector 16 is in quiet mode), heat is generated 104 to maintain the current temperature of the detector 16 at the steady state temperature of the detector 16 when the detection sensitivity of the detector 16 is set to a level enabling the detection of gamma photons (i.e., the detector 16 is in data collection mode). Hence, by way of the heating, the temperature of the detector 16 remains stable between the two modes. The heating can controlled based on feedback from, for example, a temperature sensor 88, or controlled based on heating parameters predetermined to achieve the requisite amount of heating. For example, the amount of heat generated can be dynamically generated based on the measured temperature of the detector 16.

Heat can be generated in any way, including by a resistive heater 86 or controllers 36, 38 of the detector 16. For example, a tile controller 36 can generate false events by pulsing sync lines of die controllers 38 at a rate needed to achieve the requisite heating and by filtering out event data describing the false events received from the die controllers 38. As another example, the die controllers 38 can generate false events at rates needed to achieve the requisite heating and the tile controller 36 can filter out event data describing the false events received from the die controllers 38. The rate for a die controller 38 typically corresponds to the steady state rate of event detection by the corresponding SiPMs 32 (i.e., the background rate).

Figure 8:
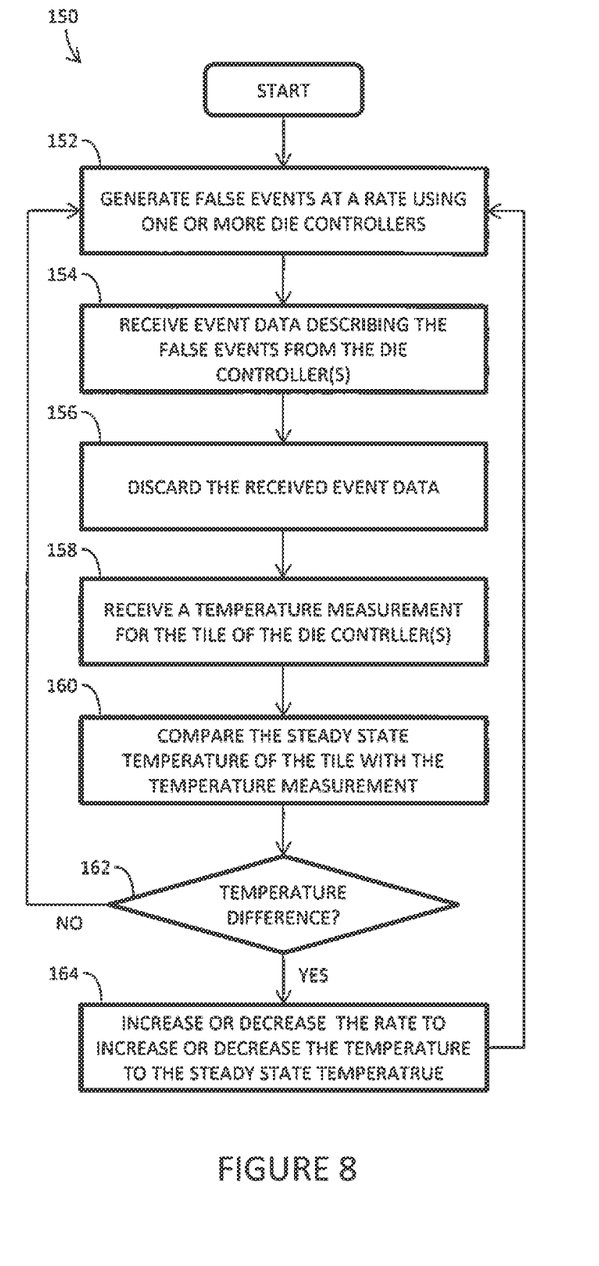
FIG. 8 illustrates a method for generating heat by generating false events.

With reference to FIG. 8, a method 150 for generating heat by generating false events is illustrated. The method 150 is suitably performed by a tile controller 36 when in the quiet mode. According to the method 150, false events are generated 152 at a rate using one or more die controllers 38 for which the tile controller 36 receives event data. The rate can be predetermined or dynamically adjusted based on feedback from, for example, the temperature sensor 88. The false events can be generated, for example, by generating pulses on the sync lines of the die controllers 38. Event data describing the false events is received 152 and subsequently discarded 156. When the rate is predetermined, the preceding actions repeat starting with the generation 152. However, additional actions are taken when the rate is dynamically adjusted.

As illustrated, the rate is dynamically adjusted. A temperature measurement is received 158 from, for example, the temperature sensor 88. The measured temperature is then compared 160 to the steady state temperature of the tile. Based on the comparison, a determination 162 is made as to whether there is a difference between the temperatures. If there is a difference, the rate is increased or decreased 164 to increase or decrease, respectively, the temperature of the tile to the steady state temperature. Otherwise, the preceding actions repeat starting with the generation 152.

The disclosed approaches employing a quiet mode of the detectors 16 of the first imaging modality 12 (e.g. PET, SPECT, or another nuclear imaging modality) during imaging data acquisition by the second imaging modality 58 (e.g. CT) is expected to provide improved detector temperature stability while preventing detector overload during the second modality imaging. However, some temperature variability may remain during operation of the first imaging modality in its data collection model. Such temperature variability, even if relatively small, can nonetheless be problematic. The thermally generated dark count rate in a pixel of an SiPM 32 varies approximately exponentially with temperature, for example doubling for every 6-9° C. increase in detector pixel temperature. The temperature dependence of the detector pixels is also expected to vary from pixel to pixel. An increase in dark count rate decreases detector pixel sensitivity. In digital SiPM designs in which pixels are reset in groups in response to digital reset logic signals, high dark counts can result in increased pixel dead time as the detectors are inoperative during reset. These dead times can cause the pixel to miss counting actual gamma rays, or cause the measured integrated energy for an actual gamma ray detection event to be artificially low so that it falls outside the energy window and is discarded, and these missed or discarded actual gamma ray detection events reduce detector sensitivity.

In view of the foregoing, it is disclosed herein to account for the impact of pixel dark current on pixel sensitivity as follows. In some digital SiPM designs, a metric of the dark current is available in the form of a non-validated trigger rate. In such digital SiPM designs, a trigger is activated by a small number of photons, possibly as few as a single photon. After trigger activation, the trigger is validated as follows: Photon counting is performed over a validation delay time interval immediately following the trigger, and if the photon count over the validation delay is greater than a validation threshold then the event is treated as an actual scintillation event and is processed and recorded. The processing and recordation of the scintillation event may, for example, include integrating the photon count over an event time interval to compute an event energy, assigning a time stamp based on the trigger time, and recording the scintillation event as a list mode datum including at least the time stamp and the event energy. On the other hand, if the photon count performed over the validation delay produces a count value that is less than the validation threshold, then the trigger is considered non-validated and no scintillation event is recorded.

In such a digital SiPM design, the non-validated trigger rate for each pixel can also be tracked, and this provides a convenient metric of the pixel dark current as a function of time. While this approach is suitable for digital SiPM detector pixels that use the above-described trigger validation methodology, in other detector pixel designs other dark current metrics may be available. For example, in an analog detector designs, the background analog pixel current may be measured and subtracted from the time-integrated analog current measured during a scintillation detection event, and in this case the measured background analog pixel current is a suitable dark current metric.

Figure 9:
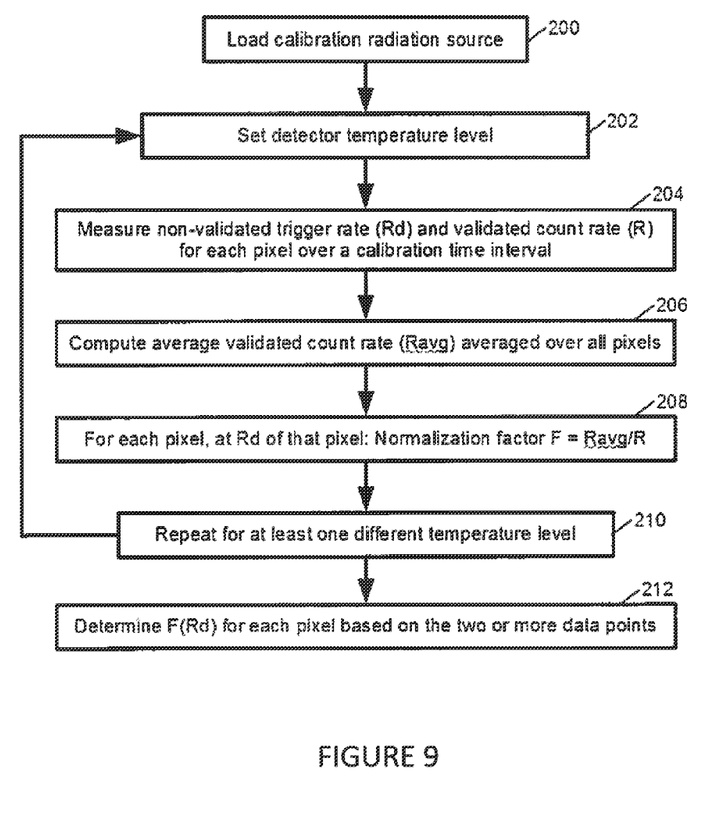
FIG. 9 illustrates a calibration method for calibrating dark current-dependent normalization tables for pixels of the first imaging modality of FIG. 1.

With reference to FIG. 9, a calibration method is described for calibrating dark current-dependent normalization tables for pixels of the first imaging modality of FIG. 1. In an operation 200, a calibration radiation source $S_{cal}$ (see FIG. 1) that emits radiation of a type of interest (for example, having energy close to the energy of gamma rays emitted by a radiopharmaceutical used during first modality imaging) is loaded at the isocenter of the examination volume 20 of the first modality scanner 12 so as to uniformly irradiate the detectors 16. The calibration radiation source $S_{cal}$ is chosen such that, when located at scanner isocenter, the radiation emission rate from the calibration radiation source $S_{cal}$ measured by each SiPM 32 (or other pixel) of each detector 16 is nominally the same (uniform irradiation). A point radiation source located at the scanner isocenter most conveniently provides this uniform irradiation. However, other calibration radiation sources may be used depending upon the geometry of the gantry. For example, the calibration radiation source may be a spherically symmetric radiation source located at isocenter. If the axial extent of the detector ring is negligible, then a planar ring-shaped or disk-shaped calibration radiation source arranged at the isocenter with its plane coincident with the detector ring plane may provide the requisite uniform irradiation of the detectors 16.

With the calibration radiation source $S_{cal}$ loaded as per operation 200, any pixel-to-pixel difference in the measured radiation emission rate is attributable to differences in pixel sensitivity. To perform dark current-dependent detector sensitivity calibration, sensitivity should be measured at two or more different dark current levels. To this end, in an operation 202 a (first) detector temperature level is set. This can be done using any suitable approach based on the available mechanisms that affect detector temperature. In a suitable approach, a detector cooling system is operated at a chosen cooling level to set the (first) detector temperature level. In general, it is not necessary to measure the actual detector temperature in operation 202, as the calibration will be performed based on measured dark current. However, it may be useful to measure the detector temperature in the operation 202 to provide additional information.

In operations 204, 206, 208, a detector pixel calibration is performed at the detector temperature level set in the operation 202. The detector pixel calibration is performed with the detection sensitivity of the gamma detector set to a level enabling the detection of gamma photons, that is, in the data collection mode. In the operation 204 a validated scintillation event count rate R is measured for each detector pixel over a calibration time interval. Additionally, the operation 204 includes measuring the non-validated trigger rate $R_d$ for each pixel (or, more generally, any other chosen dark current metric can be measured, such as the background detector current in the case of analog detector pixels). In the operation 206, an average validated count rate $R_{avg}$ is computed for all pixels of the detector array. In this operation, the "detector array" is suitably defined as the pixel array over which normalization is to be performed. For example, for a PET scanner the detector array may be the entire detector ring, or some sub-set of the detector ring such as a detector module, a detector die, or a detector tile. In the case of a gamma camera (e.g. for SPECT imaging), the detector array may be the set of all detector heads of the gamma camera, or may be the detector pixels of a single detector head, or so forth. In the operation 208, for each pixel its normalization factor F is computed as $F=R_{avg}/R$ where R is the scintillation event count rate R measured for that pixel.

The normalization factor F of a pixel computed in the operation 208 is for the dark current $R_d$ measured for that pixel, which was effectively set by the temperature level set in the operation 202. To determine the pixel normalization factor as a function of dark current, the operations 202, 204, 206, 208 are repeated for at least one different temperature level as diagrammatically indicated in FIG. 9 by operation 210. This entails repeating the operation 202 to set a (different, second) temperature level, for example by adjusting the detector cooling to a new level, and then repeating the operation 204 to determine the per-pixel dark current $R_d$ and validated count rate R at the (different, second) temperature level, computing the average count rate $R_{avg}$ over the detector array for the (different, second) temperature level as per operation 206, and computing the per-pixel normalization factor $F=R_{avg}/R$ for the (second, different) dark current $R_d$ as per operation 208.

For each pixel, the output of the (diagrammatic) operation 210 is thus a set of normalization factors F for two or more different respective dark current levels $R_d$. In a operation 212, these data points are used to determine, for each detector pixel, the normalization factor $F(R_d)$ as a function of pixel dark current for that pixel. The operation 212 can use various interpolation or estimation approaches. In one approach, the function $F(R_d)$ is assumed to have some parameterized functional form, such as a logarithmic form $\log(F(R_d))=a+bR_d$ where a and b are scalar parameters. Such a logarithmic form is consistent with the expectation that the dark current is a logarithmic function of temperature. The operation 212 then suitably fits the parameterized functional form to the set of normalization factors F for two or more different respective dark current levels $R_d$. In the illustrative logarithmic example $\log(F(R_d))=a+bR_d$, two data points are sufficient to determine the two parameters a and b, while three or more data points advantageously provide an over-determined system of equations enabling consistency checking or averaging out of experimental error. In another approach, no functional form is assumed and the a spline fit or other interpolation is used to generate $F(R_d)$, or the data points are fit to a polynomial function or other fitting function. In these approaches, it is generally preferable to have more data points to ensure the empirical fit is reasonably representative. The output of the final operation is then a normalization factor $F(R_d)$ as a function of dark current $R_d$ for each pixel of the pixel array.

Figure 10:
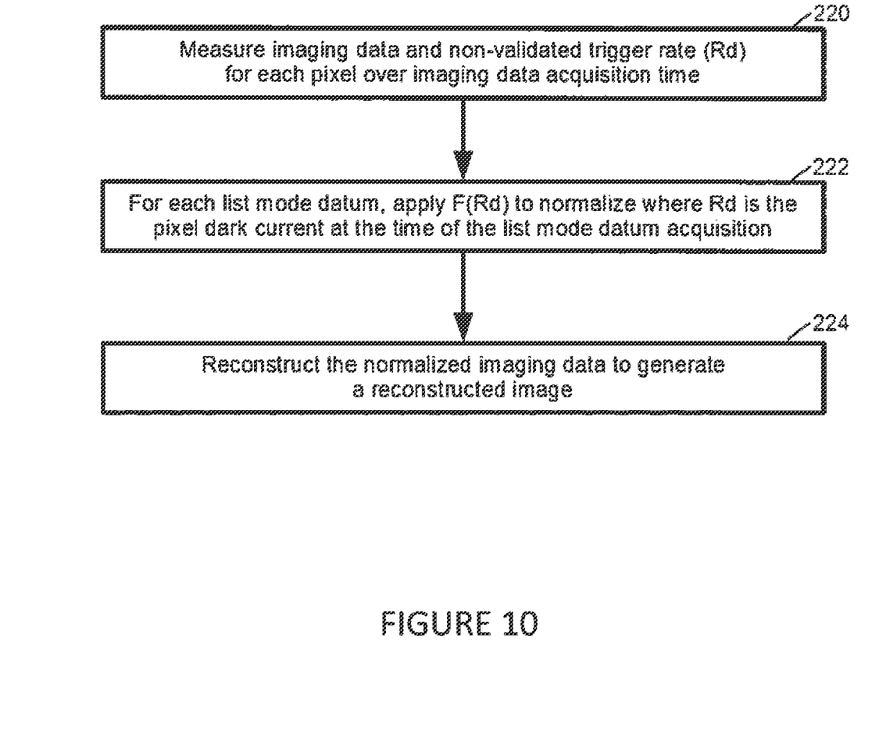
FIG. 10 illustrates an imaging method performed by the first imaging modality of FIG. 1 using the dark current-dependent normalization tables generated by the calibration method of FIG. 9.

With reference to FIG. 10, the per-pixel normalization factors $F(R_d)$ as a function of dark current $R_d$ are used during image reconstruction. In an operation 220, imaging data are acquired using the first modality 12 as usual, and additionally the non-validated trigger rate $R_d$ is also measured for each detector pixel over the imaging time. The operation 220 is performed with the detection sensitivity of the gamma detector set to a level enabling the detection of gamma photons, that is, in the data collection mode. The detector temperature, and hence the dark current, is expected to vary relatively slowly, so that $R_d$ does not need to be measured in the operation 220 at precisely the same time as the scintillation event, and does not need to be measured at the time scale of scintillation events (which, by way of illustrative example, may be on the order of nanoseconds to tens of nanoseconds for time-of-flight PET). In practice, some digital SiPM-based detectors enable measurement of the non-validated trigger rate (a suitable metric for dark current $R_d$ for digital SiPM detector pixels) on the order of several thousand rate measurements per second.

In an operation 222, for each scintillation detection event the normalization factor $F(R_d)$ at the dark current $R_d$ measured for that scintillation detection event is applied. The resulting dark current-dependent normalized datum is suitably recorded, for example as a list mode datum including the normalized time-integrated current for the scintillation event and the validated trigger time stamp for the scintillation event. The normalization operation 222 may be performed at various locations along the data processing chain, at the gantry-level or off-gantry. In one suitable approach, the normalization operation 222 is performed at the event verification processor 52. In this case, the measurements of the dark current $R_d$ are off-loaded from the gantry so as to be available at the processor 52. In another suitable approach, the normalization operation 222 is performed at the tile controller 36. In this case, the measurements of the dark current $R_d$ do not need to be off-loaded from the gantry, and in one approach only the latest $R_d$ measurement is stored in a memory buffer of the tile controller 36 for use in the normalization. In an operation 224, the normalized imaging data are reconstructed by the reconstruction processor 54 as already described.

As used herein, a memory includes any device or system storing data, such as a random access memory (RAM) or a read-only memory (ROM). Further, as used herein, a processor includes any device or system processing input device to produce output data, such as a microprocessor, a microcontroller, a graphic processing unit (GPU), an application-specific integrated circuit (ASIC), an FPGA, and the like; a controller includes any device or system controlling another device or system, and typically includes at least one processor; a user input device includes any device, such as a mouse or keyboard, allowing a user of the user input device to provide input to another device or system; and a display device includes any device for displaying data, such as a liquid crystal display (LCD) or a light emitting diode (LED) display.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. A gamma detector with thermal stability, said gamma detector comprising:
  at least one controller which:
    sets the detection sensitivity of the detector to a level disabling the detection of gamma photons; and
    controls a heat generator to maintain the temperature of the detector at a predetermined temperature, the predetermined temperature being the steady state temperature of the detector when the detection sensitivity of the detector is set to a level enabling the detection of gamma photons.

2. The detector according to claim 1, wherein the controller further determines whether the detection sensitivity of the detector is set to a level disabling the detection of gamma photons by:
  monitoring a signal indicating whether the gamma detector is in a quiet mode or a data collection mode, the quiet mode corresponding to the detection sensitivity level disabling the detection of gamma photons, and the data collection mode corresponding to the detection sensitivity level enabling the detection of gamma photons.

3. The detector according to claim 1, further including:
  a temperature sensor measuring the current temperature of the detector, wherein the at least one controller:
    receives measurements of the current temperature of the detector; and
    controls the heat generator to maintain the received measurements of the current temperature of the detector at the predetermined temperature.

4. The detector according to claim 1, wherein the at least one controller controls the detector to generate false events to maintain the current temperature of the detector at the predetermined temperature.

5. The detector according to claim 4, further including:
  a plurality of die controllers;
  a tile controller which receives event data describing the generated false events from the die controllers;
  scintillators; and
  arrays of silicon photomultipliers (SiPMs) corresponding to the plurality of die controllers and optically coupled to the scintillators;
  wherein the at least one controller generates the false events at the steady state rate with which the SiPMs detect light pulses generated by the scintillators at the detection sensitivity level enabling the detection of gamma photons.

6. The detector according to claim 1, wherein the heat generator includes:
  a resistive heater.

7. The detector according to claim 1, wherein the heat generator includes:
  a controller generating heat through operation.

8. A medical imaging system comprising:
  a first, nuclear scanner including a plurality of detectors arranged around a bore of the first scanner, each of the detectors according to claim 1, wherein the first scanner:

receives a request to transition the detector from a data collection mode to a quiet mode; and in response to the request, sets the detection sensitivity of the detectors to the level disabling the detection of gamma photons.

9. The medical imaging system according to claim 8, further including:

a second, x-ray scanner positioned proximate to the first scanner; and a control system which:

coordinates imaging using the first and second scanners; and in response to imaging using the second scanner, provides the request to the first scanner.

10. A method of operating a gamma detector, said method comprising:

determining whether the detection sensitivity of the detector is set to a level disabling the detection of gamma photons; and in response to determining that the detection sensitivity of the detector is set to a level disabling the detection of gamma photons, generating heat to maintain the current temperature of the detector at a predetermined temperature, the predetermined temperature being the steady state temperature of the detector when the detection sensitivity of the detector is set to a level enabling the detection of gamma photons.

11. The method according to claim 10, wherein the determining includes:

receiving a signal indicating whether the gamma detector is in a quiet mode or a data collection mode, the quiet mode corresponding to the detection sensitivity level disabling the detection of gamma photons, and the data collection mode corresponding to the detection sensitivity level enabling the detection of gamma photons.

12. The method according to claim 10, wherein the detector includes a plurality of die controllers and a tile controller, and wherein the generating of heat includes:

generating false events to maintain the current temperature of the detector at the predetermined temperature; and by the tile controller:

receiving event data describing the generated false events from the die controllers; and discarding the received event data.

13. The method according to claim 10, further including:

generating heat to maintain the current temperature of the detector at the predetermined temperature through operation of a controller of the detector.

14. The method according to claim 10, further including:

performing a computed tomography (CT) scan of a subject while the detection sensitivity of the detector is set to the level disabling the detection of gamma photons; and performing a positron emission tomography (PET) or single-photon emission computed tomography (SPECT) scan of the subject while the detection sensitivity of the detector is set to the level enabling the detection of gamma photons.

15. The method according to claim 10, further including:

acquiring imaging data using the gamma detector with the detection sensitivity of the gamma detector set to a level enabling the detection of gamma photons, the acquiring including detecting light pulses generated by gamma photons in scintillators of the gamma detector using detector pixels of the gamma detector;

during the acquiring, measuring dark currents of the detector pixels of the gamma detector;

determining dark current-dependent normalization factors for detector pixels of the gamma detector based on the measured dark currents of the detector pixels;

normalizing the acquired imaging data using the determined dark current-dependent normalization factors to generate normalized imaging data; and reconstructing the normalized imaging data to generate a reconstructed image.

16. The method according to claim 10, further including:

generating dark current-dependent normalization factors for detector pixels of the gamma detector by operations including:

(i) acquiring count rates for detector pixels of the gamma camera for a calibration radiation source ($S_{cal}$) uniformly irradiating the detector pixels;

(ii) concurrently with operation (i), measuring dark currents for the detector pixels;

(iii) generating detector pixel normalization factors for the detector pixels from the count rates acquired in operation (i);

(iv) repeating operations (i)-(iii) for at least two different temperatures of the gamma detector to generate detector pixel normalization factors for each detector pixel at different measured dark currents; and (v) generating dark current-dependent pixel normalization factors for the detector pixels from the detector pixel normalization factors at different measured dark currents.

17. A nuclear imaging system comprising:

a detector including radiation detector pixels and a controller, the detector having a quiet mode in which radiation detection by the radiation detector pixels is disabled and a data collection mode in which radiation detection by the radiation detector pixels is enabled, the radiation detector pixels having a steady state operating temperature when the detector is in the data collection mode;

the controller comprising a processor configured to respond to the detector being in the quiet mode by generating heat to maintain the steady state operating temperature of the detector pixels while the detector is in the quiet mode.

18. An imaging system comprising:

a gamma detector including scintillators and detector pixels configured to detect light pulses generated in the scintillators by gamma photons; and electronic components configured to:

acquire imaging data using the gamma detector and concurrently measure dark currents of the detector pixels of the gamma detector, determine dark current-dependent normalization factors for detector pixels of the gamma detector based on the measured dark currents of the detector pixels, normalize the acquired imaging data using the dark current-dependent normalization factors to generate normalized imaging data, and generate a reconstructed image from the normalized imaging data.

19. The imaging system of claim 18 wherein the detector pixels comprise silicon photomultipliers (SiPMs) configured to perform photon counting using a trigger-and-validate process and the electronic components are configured to measure dark currents as non-validated, trigger rates of the detector pixels.

20. The imaging system of claim 18, wherein the electronic components are configured to determine dark current-dependent normalization factors based on a normalization factor $F(R_d)$ for each pixel of the pixel array which is a function of pixel dark current $R_d$.

21. The imaging system of claim 18, wherein the electronic components are further configured to generate dark current-dependent normalization factors as a function of dark current for detector pixels of the gamma detector by operations including:
(i) acquiring count rates for detector pixels of the gamma camera for a calibration radiation source ($S_{cal}$) uniformly irradiating the detector pixels;
(ii) concurrently with operation (i), measuring dark currents for the detector pixels;
(iii) generation detector pixel normalization factors for the detector pixels from the count rates acquired in operation (i);
(iv) repeating operations (i)-(iii) for at least two different temperatures of the gamma detector to generate detector pixel normalization factors for each detector pixel at different measured dark currents; and
(v) generating dark current-dependent pixel normalization factors as a function of dark current for the detector pixels from the detector pixel normalization factors at different measured dark currents.

22. The imaging system of claim 21 wherein the operation (v) comprises, for each detector pixel, fitting parameters of a dark current-dependent pixel normalization factor $F(R_d)$ as a function of dark current $R_d$ to the generated detector pixel normalization factors for the detector pixel at the different measured dark currents.

23. The imaging system of claim 21, wherein the operation (iii) comprises:
computing an average count rate $R_{avg}$ averaged over the detector pixels of the gamma detector; and
computing the detector pixel normalization factor F for each detector pixel as $F=R_{avg}/R$ where R is the count rate acquired for the detector pixel in the operation (i).

24. It The imaging system of claim 18, wherein the electronic components are configured to concurrently measure dark currents of the detector pixels of the gamma detector as one of (I) non-validated trigger rates of detector pixels comprising digital silicon photomultipliers (digital SiPMs) and (II) background analog pixel currents of detector pixels comprising analog detector pixels.

* * * * *